(12) United States Patent
Lopez et al.

(10) Patent No.: US 7,142,318 B2
(45) Date of Patent: Nov. 28, 2006

(54) PRINTING WEB PAGE IMAGES VIA A MARKED PROOF SHEET

(75) Inventors: Matthew G Lopez, Escondido, CA (US); John Mark Hatcher, Escondido, CA (US); Robert C Sismilich, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 958 days.

(21) Appl. No.: 09/916,370

(22) Filed: Jul. 27, 2001

(65) Prior Publication Data

US 2003/0020945 A1    Jan. 30, 2003

(51) Int. Cl.
G06F 15/00    (2006.01)
(52) U.S. Cl. .................... 358/1.15; 358/1.18; 358/474; 715/501.1
(58) Field of Classification Search ............... 358/1.15; 715/501.1
See application file for complete search history.

(56) References Cited

U.S. PATENT DOCUMENTS

| | | | |
|---|---|---|---|
| 4,441,807 A | 4/1984 | Bartz | |
| 5,359,387 A | 10/1994 | Hicks | |
| 5,933,600 A * | 8/1999 | Shieh et al. | 709/219 |
| 6,017,157 A * | 1/2000 | Garfinkle et al. | 396/639 |
| 6,122,657 A * | 9/2000 | Hoffman et al. | 709/201 |
| 6,141,111 A | 10/2000 | Kato | |
| 6,366,947 B1 * | 4/2002 | Kavner | 709/203 |
| 6,535,298 B1 | 3/2003 | Winter et al. | |
| 6,623,528 B1 * | 9/2003 | Squilla et al. | 715/523 |
| 6,657,702 B1 * | 12/2003 | Chui et al. | 355/40 |
| 6,667,814 B1 * | 12/2003 | Tillotson | 358/1.15 |
| 6,701,350 B1 * | 3/2004 | Mitchell | 709/217 |
| 6,744,529 B1 | 6/2004 | Winter et al. | |
| 6,784,925 B1 * | 8/2004 | Tomat et al. | 348/207.11 |
| 6,942,150 B1 * | 9/2005 | Knowles | 235/462.01 |
| 2001/0019416 A1 | 9/2001 | Monty et al. | |
| 2001/0049703 A1 * | 12/2001 | Miyoshi et al. | 707/527 |
| 2002/0087546 A1 * | 7/2002 | Slater et al. | 707/10 |
| 2002/0087577 A1 * | 7/2002 | Manjunath et al. | 707/104.1 |
| 2003/0026612 A1 * | 2/2003 | Ohta | 396/429 |
| 2003/0035144 A1 * | 2/2003 | Shima | 358/1.18 |
| 2003/0123079 A1 | 7/2003 | Yamaguchi et al. | |

FOREIGN PATENT DOCUMENTS

| | | |
|---|---|---|
| JP | 11-017861 | 1/1999 |
| JP | 11-134125 | 5/1999 |
| JP | 2000-066865 | 3/2000 |

OTHER PUBLICATIONS

Press Release, Mar. 22, 1999 Compaq Goes All-In-One With New A900 For Printing, Faxing, Color Copying and Scanning.
Compaq A1000 All-In-One User Guide, 1999.
Compaq A900 All-In-One User Guide, 1998.

* cited by examiner

*Primary Examiner*—Joseph R. Pokrzywa
*Assistant Examiner*—Mark R. Milia

(57) ABSTRACT

A printing system and method for printing selected images on a web page. The web page is automatically analyzed to identify image files associated with the web page, and the image files are automatically filtering according to predetermined criteria so as to identify qualified image files. At least one of the qualified image files is selected for printing, and then printed. A proof sheet having an image identifier and a corresponding selection area or image specifier for each image file may be printed. Selection areas of the proof sheet can be marked to indicate the image files to be printed and then optically scanned to detect the images selected for printing, or the image specifiers can be entered into the printing system to specify the images selected for printing.

13 Claims, 15 Drawing Sheets

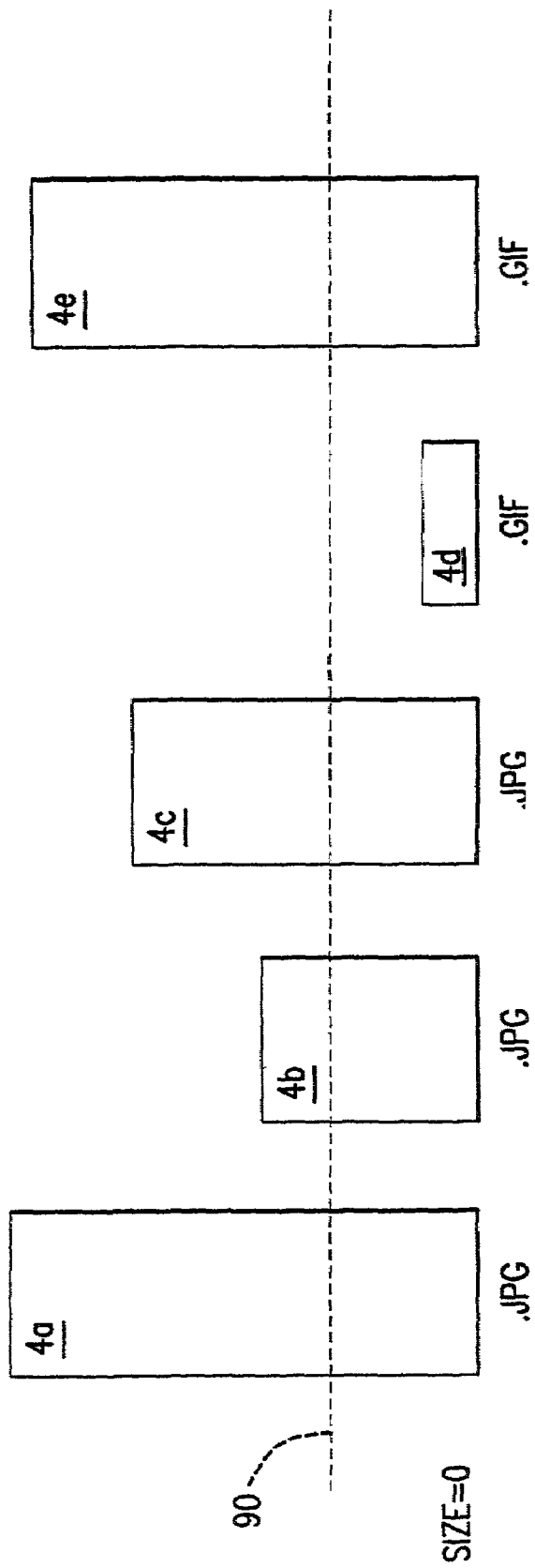

PRINTING WEB PAGE IMAGES VIA A MARKED PROOF SHEET

CROSS-REFERENCE TO RELATED APPLICATIONS

This application relates to the subject matter disclosed in the co-pending U.S. application Ser. No. 09/173,050, by Winter et al., titled "System And Method For Printing And Scanning A User-Completed Digital Still Camera Image Proof Sheet And Order Form", filed May 10, 2001 as a continued prosecution application of its parent application of the same Ser. No. 09/173,050 which was filed Oct. 15, 1998.

This application also relates to the subject matter disclosed in the co-pending U.S. application Ser. No. 09/735,090, by Winter et al., titled "Storing And Retrieving Digital Camera Images Via A User-Completed Proof Sheet", filed Dec. 12, 2000 as a continuation-in-part of Ser. No. 09/173,050 by Winter et al.

This application also relates to the subject matter disclosed in the co-pending U.S. application Ser. No. 09/767,935, by Monty et al., titled "Specifying Image File Processing Operations Via Device Controls And A User-Completed Proof Sheet", filed Jan. 23, 2001 as a continuation-in-part of Ser. No. 09/173,050 by Winter et al.

All of these applications are assigned to the assignee of the present invention and are hereby incorporated by reference in their entirety.

FIELD OF THE INVENTION

The present invention relates generally to the printing of digital images, and pertains more particularly to systems and methods for the selection and printing of digital images included on Internet web pages.

BACKGROUND OF THE INVENTION

The rapidly increasing establishment of web pages by businesses, organizations, and individuals has resulted in the widespread usage and accessibility of digital images on the Internet. Many web pages display digital images along with textual information. On many occasions surfers of these web pages desire to obtain a printed copy of one or more of these images.

The growth of digital photography also is contributing to the presence of large numbers of digital images on the Internet, as photographers increasingly store their photos on-line in photo storage sites such as Hewlett-Packard Co.'s "HP Photo" web site. Business associates, family, and friends of a photographer can view the digital photos and on many occasions desire to obtain printed copies.

Viewing and selecting images for printing is conventionally and easily done by connecting a computer to the Internet, viewing the desired web pages or photo storage sites using a web browser, and using the browser to select and print the images on a printer attached to the computer. Color inkjet printers, for example, can typically be purchased for a small fraction of the cost of a computer system.

However, some users may not need or want to own or operate a computer, but still would like to obtain digital images or photographs from the Internet. The user may not be able to afford a computer, may not feel technically proficient enough to operate it, or may generally have no need for it. Many of these users have found multifunction printers to be an attractive alternative to a computer system. Multifunction printers typically provide a fax machine, a scanner, and a copier. Certain multifunction printers also provide the ability to connect to the Internet, through either a dial-up Internet connection made over the same phone line used for the fax machine function, or via an accessory module connected to the printer. While it would be desirable to select and print digital images using only the printer, it is currently impractical to do so in an efficient manner without the interactive web page viewing and image selection typically done through a computer.

Some digital camera users may utilize a standalone printer solely for printing their digital photographs. Such printers typically provide for a connection to the digital camera, either via an electrical link or by providing a slot for a digital image memory card that can be removed from the camera and inserted in the printer. Certain of these printers may be similarly connected to the Internet.

Accordingly, it would be highly desirable to have a new and improved printer and printing method that allows digital images associated with Internet web pages to be previewed, selected, and printed without the need for attaching a computer to the printer.

SUMMARY OF THE INVENTION

In a preferred embodiment, the present invention provides a method of printing with a printing system that allows selected digital images from web pages to be printed. The method automatically analyzes the web page to identify the image files associated with the page, and automatically filters the image files according to predetermined criteria in order to identify qualified image files. One or more of the qualified image files are then selected and printed.

Alternate embodiments of the method print a proof sheet for at least some of the image files associated with the web page. In one such embodiment, at least one selection area of a proof sheet corresponding to at least one of the image files to be printed is marked. The marked proof sheet is scanned so as to determine marked selection areas, and the image files associated with the marked selection areas are printed. In another such embodiment, at least one image specifier from the proof sheet is provided to the printing system, and the corresponding image files printed.

BRIEF DESCRIPTION OF THE DRAWINGS

The above-mentioned features of the present invention and the manner of attaining them, and the invention itself, will be best understood by reference to the following detailed description of a preferred embodiment of the invention, taken in conjunction with the accompanying drawings, wherein:

FIG. 2B is a schematic representation of an exemplary set of image files associated with the web page of FIGS. 2A and 2D, including an exemplary set of qualified image files and an exemplary set of selected image files;

FIG. 2C is a schematic representation of an exemplary image file network URL address for one of the image files of FIG. 2B;

FIGS. 3B–3C illustrate image indicia and selection areas of the proof sheet of FIG. 3A for selecting image files for final printing;

DESCRIPTION OF THE PREFERRED EMBODIMENT

Figure 1A:
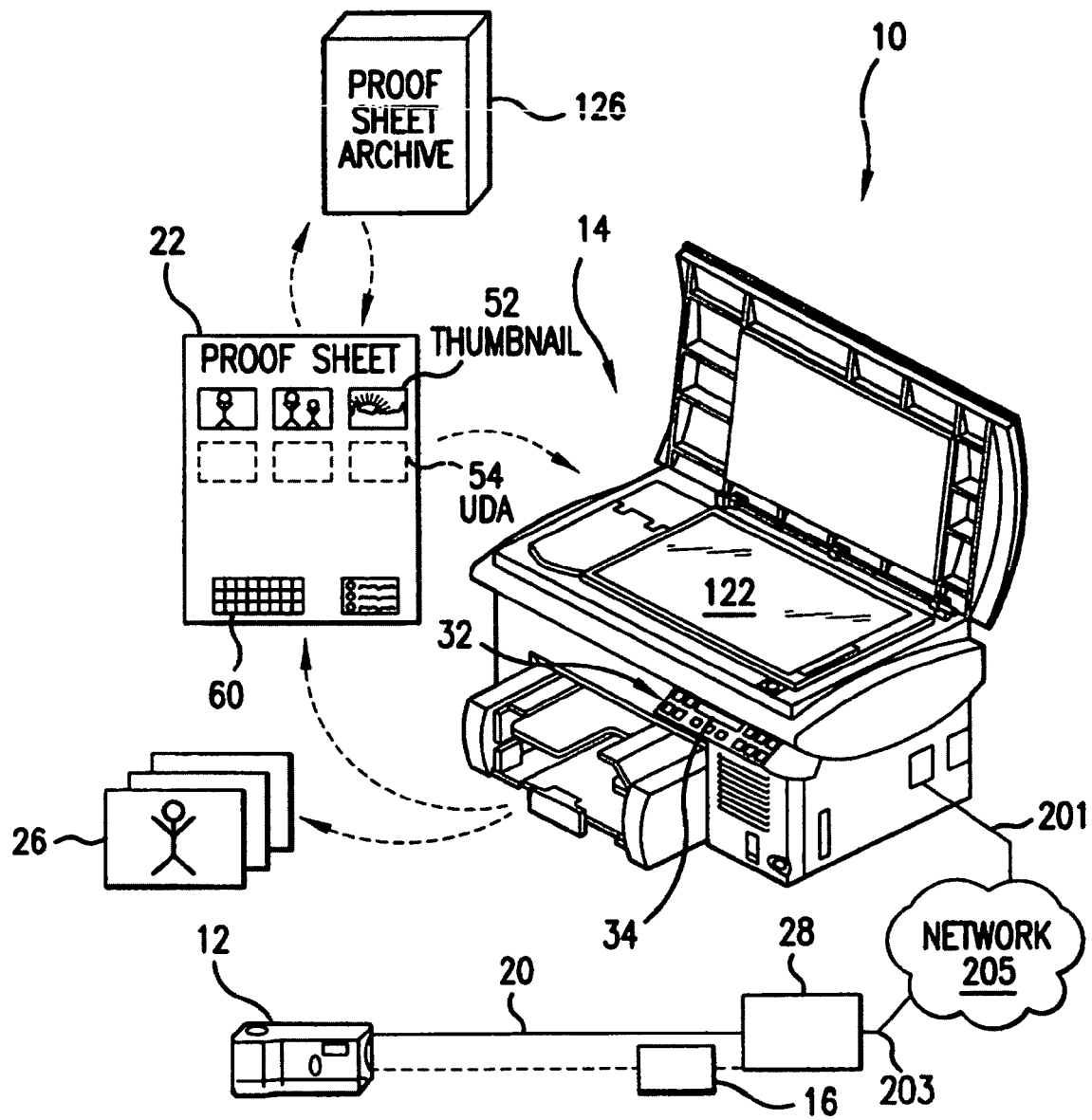
FIGS. 1A–1B are schematic representations of different embodiments of a printing system according to the present invention.

Referring now to the drawings, there is illustrated a printing system constructed in accordance with the present invention which enables digital images associated with Internet web pages to be previewed, selected, and printed without the need for a computer attached to the printer. The printing system preferably includes subsystems which obtain certain image files associated with a specified web page, print a proof sheet associated with those images, allow the user to select which of the images are to be printed, and print these user-selected image files. In operation according to a preferred embodiment of a novel method of printing of the present invention, the web page is acquired and analyzed to identify image files associated therewith. The image files are filtered according to qualifying criteria, and one or more are selected for printing. The selected images are then obtained and printed.

As best understood with reference to FIGS. 1A and 2A–C, a presently preferred embodiment of the printing system 10 includes a multifunction printer 14 having both printing and optical scanning capabilities. The printer 14 is connectable to a network 205, such as the Internet, over network link 201. The network 205 provides access to web pages, such as exemplary web page 8, which the printer 14 can download over network link 201. The printer 14 is manually operable by one or more of the plurality of pushbuttons 32 on the printer 14. Some of the pushbuttons 32 may be configured as "speed dial" buttons which, when operated, cause the printer 14 to connect to the network 205 and/or request a specific web page, such as web page 8, from the network 205. A display 34 provides feedback to the user about the operation of the printer 14.

The web page 8 may be associated with one or more digital image files, such as exemplary image files 4. The web page 8 and the digital image files 4 are typically stored on a computing apparatus 28 which is connected to the network 205 by network link 203. A representation 9 of the web page 8 and the image files 4 may be rendered on a computer monitor (not shown) of computing apparatus 28 by a web browser (not shown); image files 4a—4a are rendered as images 6a–6e respectively. Some of the digital image files 4 may be digital photographs taken by a digital camera 12. Digital image files 4 may be transferred from the camera 12 to the computing apparatus 28 over a data link 20, or alternatively the image files 4 may be stored on a removable memory device 16 (such as a memory card) which can be removed from the camera 12 and inserted into a compatible card reader (not shown) on the computing apparatus 28.

Considering now in further detail the preferred embodiment of the multifunction printer 14, the printer 14 includes an internet access subsystem 70. The internet access subsystem 70 communicates with the network 205 to obtain the web page 8 and image files 4 using the appropriate network stack and protocols, such as http (hypertext transfer) protocol, known to those skilled in the art. The desired web page's network address (also known as a URL) 72 is provided to the internet access subsystem 70. As is known to those skilled in the art, a URL for exemplary web page 8 might be "www.website.com/MyPix/MyWebPage.html".

The URL 72 is preferably prestored to one of the "speed dial" pushbuttons 32 previously described. Alternatively, others of the pushbuttons 32 may be configured as an alphanumeric keypad for specifying the web page URL 72. When the "speed dial" pushbutton 32 corresponding to the desired web page 8 is operated, or the corresponding alphanumeric data entered at the keypad, the web page URL 72 is communicated to the internet access subsystem 70. In response, the internet access subsystem 70 retrieves the source code file (typically containing text in a markup language such as HTML) for the web page 8 from the network 205 and sends it to a webpage analyzer subsystem 74. The web page analyzer subsystem 74 parses the markup text to identify image file URLs 73 for the image files 4 associated with the web page 8 and, as will be discussed subsequently in greater detail, obtains certain ones of the image files 4 from the network 205. Which ones of the image files 4 are to be obtained is determined by filtering criteria 76 established by the user, preferably through operation of others of the pushbuttons 32 which specify the filtering criteria 76. The web page analyzer subsystem 74 applies the filtering criteria 76, which also will be discussed subsequently in greater detail, to the set of image files 4 associated with the web page 8, in order to determine which are the qualified image files 3 that satisfy the filtering criteria 76. Then the web page analyzer subsystem 74 provides the image file URLs 73 for the qualified image files 3 to the internet access subsystem 70 in order to obtain the qualified image files from the network 205, and when the qualified image files 3 are obtained, communicates both the qualified image files 3 and their corresponding image file URLs 73 to an image proofing subsystem 78.

The image proofing subsystem 78 then forms the content of a user-markable proof sheet 22 for the qualified image files 3. As will be discussed subsequently in further detail, the proof sheet 22 includes an indicia 52 (such as a thumbnail image and/or a filename) for each qualified image file 3, and a user-designation area 54 associated with each indicia 52. As will also be discussed subsequently in greater detail, at least one identity marker 60 indicative of the image file URLs 73 for the qualified image files 3 is also formed on the proof sheet by the image proofing subsystem 78. The image proofing subsystem 78 sends the proof sheet content to a printer subsystem 80 which produces the proof sheet 22.

After the user chooses selected ones of the qualified image files 2 for printing by marking the user-designation areas 54 associated with the indicia 52 of the selected image files 2, the user places the marked proof sheet 22 on a scan platen 122 where it is optically scanned by a scanner subsystem 86. The scanned image is communicated from the scanner subsystem 86 to a proof sheet analyzer subsystem 82. The proof sheet analyzer subsystem 82 detects and interprets the markings made by the user in the user designation areas 54 (also known as image selection areas 54) to identify the user-selected image files 2, and associates each of the individual user designation areas 54 with a corresponding image file URL 73 via the identity marker 60. The proof sheet analyzer subsystem 82 then provides the image file URLs 73 to the internet access subsystem 70 in order to obtain the user-selected image files 2 from the network 205. When the image files 2 have been retrieved, the proof sheet analyzer 82 sends them to an image printing subsystem 84 along with the printing instructions marked by the user in the user-designation area 54 for each image file. These printing instructions generally include print size, as will be discussed subsequently in greater detail, and may also incorporate other instructions such as border size and color, rotation, brightness, image color shade, and print media type. The image printing subsystem 84 renders each image file 2 according to the printing instructions, and sends the print content to the printer subsystem 80 for generating the image prints 26.

Figure 1B:
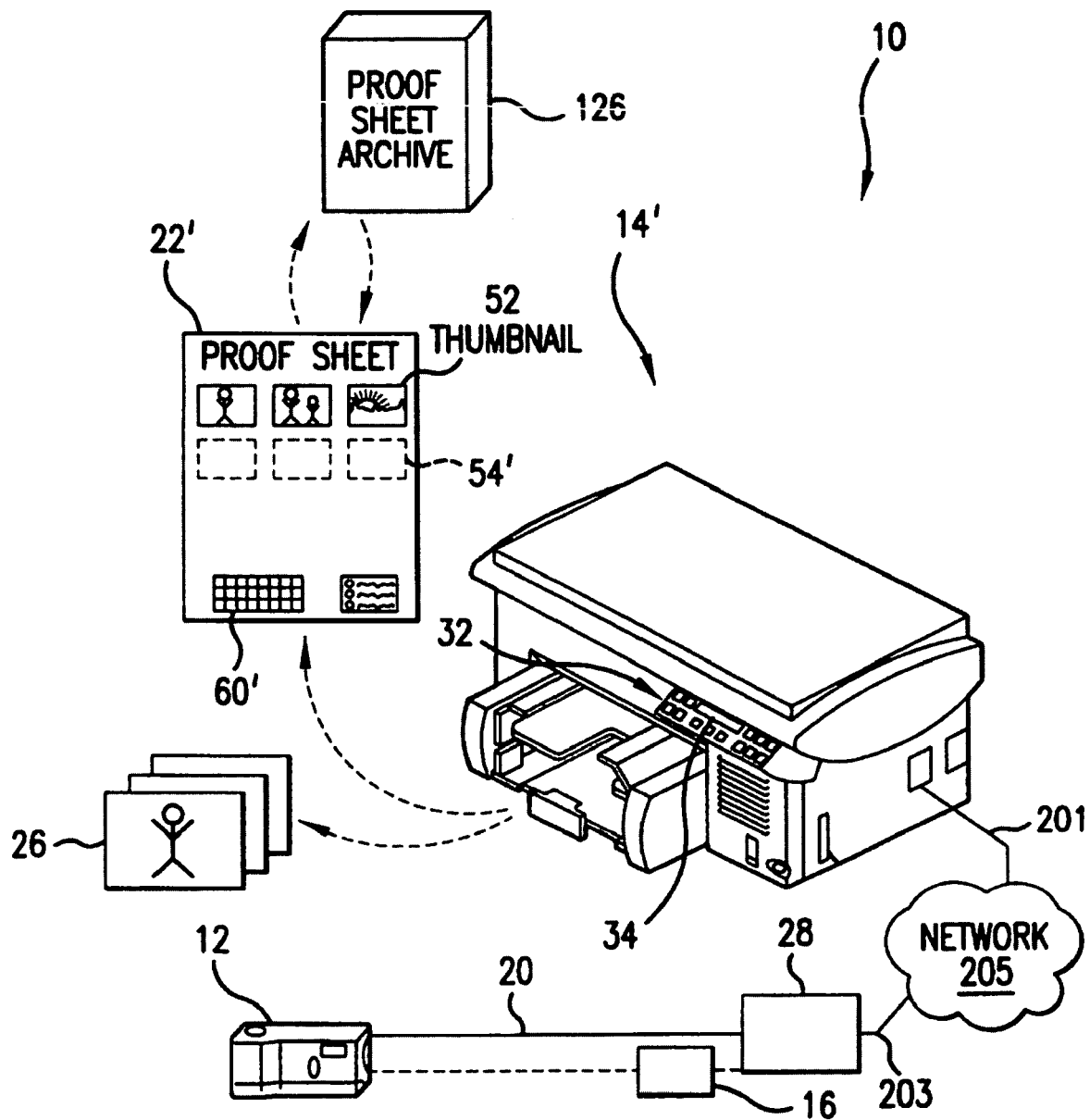
Figure 2A:
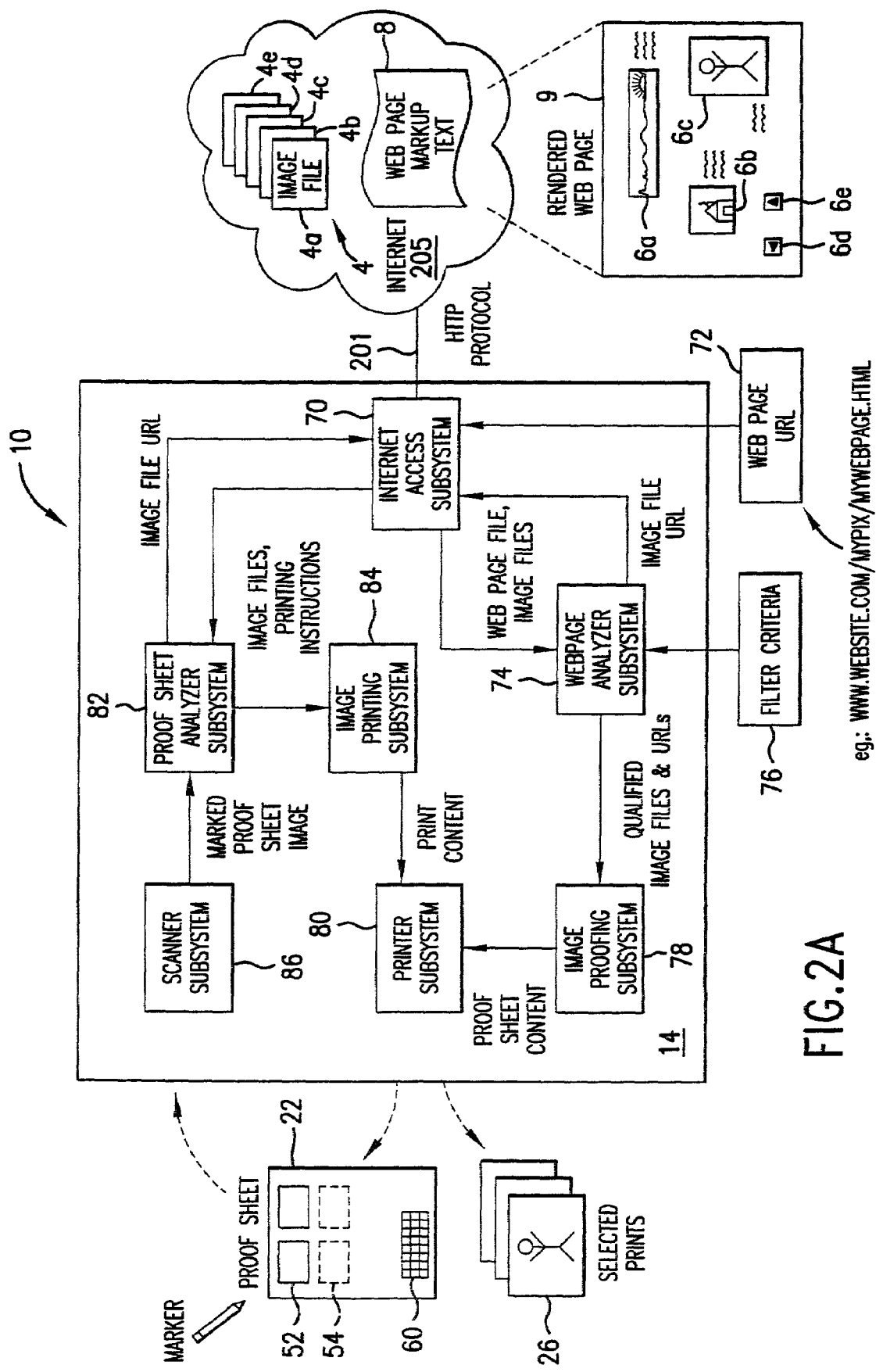
FIG. 2A is a more detailed schematic representation of the multifunction printing system of FIG. 1A illustrating a subsystem block diagram of a multifunction printer in the system and an exemplary web page accessible by the printer.
Figure 2D:
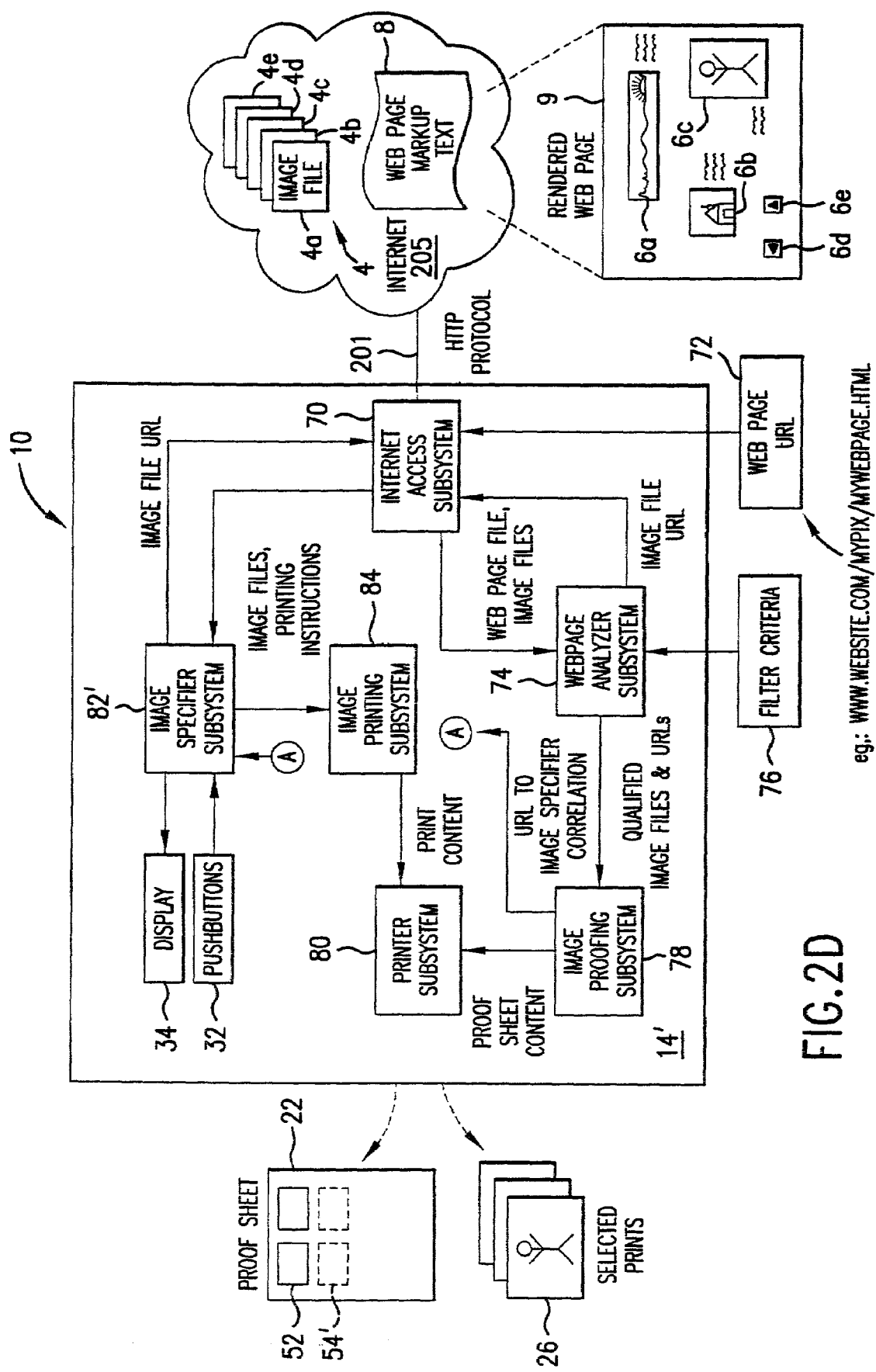
FIG. 2D is a more detailed schematic representation of the printing system of FIG. 1B illustrating a subsystem block diagram of a printer in the system and an exemplary web page accessible by the printer.

Considering now the differences between the preferred embodiment described heretofore and an alternate embodiment of the printing system 10, and as best understood with reference to FIGS. 1B and 2D, the alternate printing system 10 includes a printer 14' rather than the multifunction printer 14. Printer 14' does not include a scanner subsystem 86 or a scan platen 122. The proof sheet 22' does not include a user designation area 54, but rather includes an image specifier 54' associated with each image indicia 52. In order to generate an image print 26 for an image file 2, the image specifier 54' associated with the image file 2 is communicated to the printer 14'. Preferably this is done via pushbuttons 32, and in conjunction with prompts presented on display 34, of the printer's user interface under control of the image specifier subsystem 82'. An interactive dialog is typically used to specify the other printing instructions, such as print size and print media type, as well.

The above-described subsystems 70,74,78,80,82,82',84, 86 are preferably implemented in firmware or software stored on a program storage medium such as a ROM, CD-ROM, or the like and executable by a processor or microcomputer (not shown) disposed within printer 14,14'. Alternatively, subsystems 70,74,78,80,82,82',84,86 may be implemented in printer hardware such as discrete logic or an ASIC, or in a combination of firmware, software, and hardware.

Figure 3A:
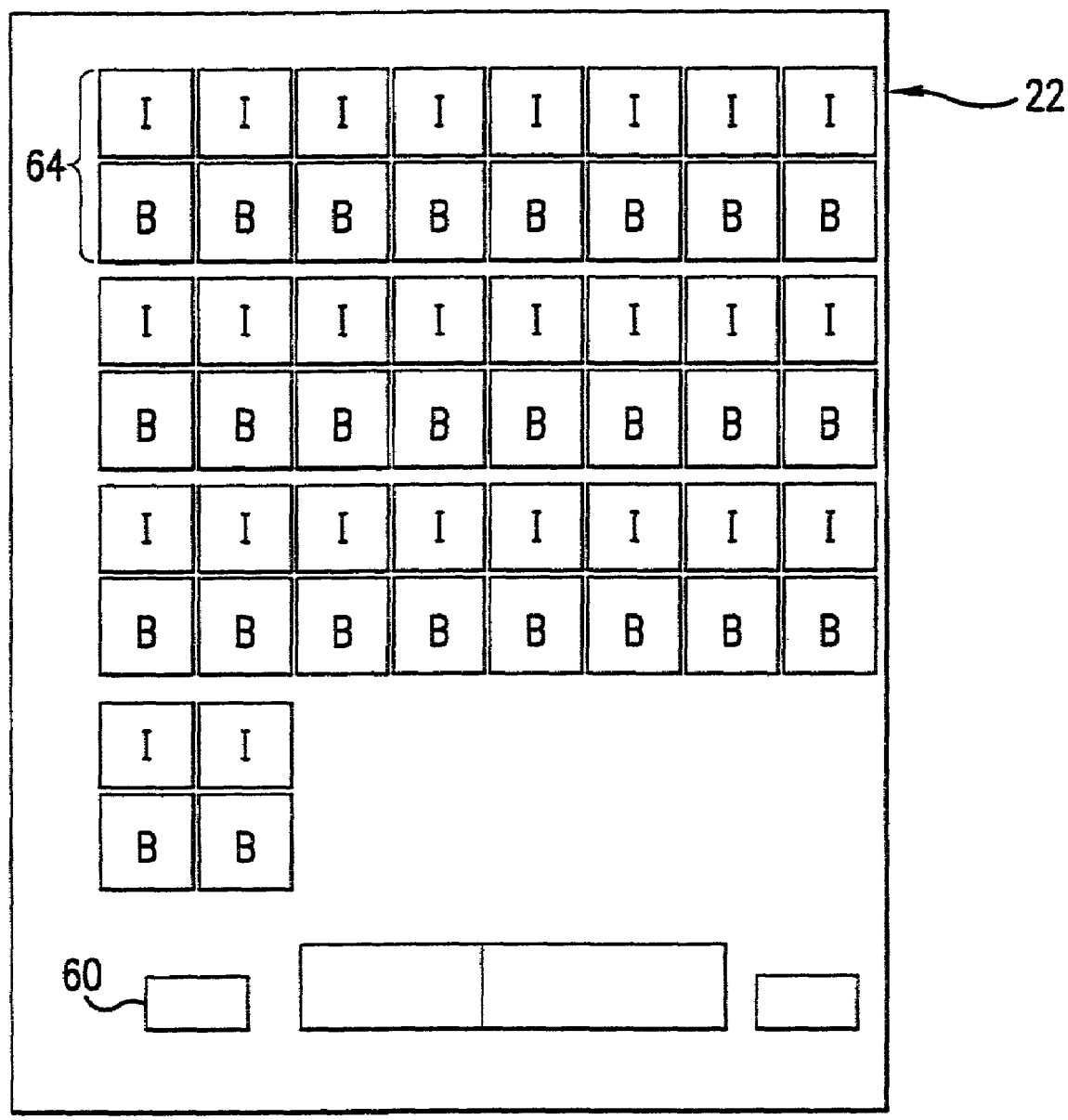
FIG. 3A illustrates a proof sheet that may be utilized with the system of FIGS. 1A–1B to select one or more image files for final printing.

Considering now in further detail one preferred embodiment of the user-markable proof sheet 22, FIG. 3A is a detailed plan view of an exemplary combination proof sheet and order form 22 that may be utilized with the system 10 of FIG. 1A to select one or more images from an array of thumbnail images such as 52 (FIG. 3C) for final printing. By way of example, there are twenty-five thumbnail images labeled "I" in FIG. 3A arranged in an array of four rows and eight columns on the form 22. The term "thumbnail" is a term of convenience used to describe printed graphical representations of reduced size and/or quality that are sufficiently small so that an array of the same can be printed on a single sheet of paper for simultaneous viewing and evaluation by a user. The thumbnail images I are preferably printed in color, although they could be black and white. They are made up of microscopic pixels of color pigment applied in a well known manner to achieve the image definition, tone, shading, resolution and other image characteristics required. It will be understood that the thumbnail images I are typically of lower quality than the final print images. The thumbnail images are displayed in an array to allow the user to quickly and easily select which of the digitally stored images transferred from the camera 12 that he or she wants to print in final, higher quality form.

The combination proof sheet and order form 22 (FIG. 3A) includes image selection user designation areas such as 54 (FIG. 3C) adjacent each of the thumbnail images I. The user designation areas 54 include rows and columns of bubbles 56 that can be manually filled in by a user with a pen or a pencil. Other discrete regions could be utilized as user designation areas such as vertical stripes or slots between two adjacent vertical bars. The user designation areas could consist of discrete bounded regions in which a user could write in print or cursive form numbers, digits or symbols that could be read with optical character recognition (OCR) software. Alternatively, a user could punch out holes or apply stickers or conductive markers. Besides optical scanning, the printer could use electrical or mechanical detection of the completed user designation areas. The user designation areas 54 of the form 22 also include user readable printed indicia in the form of the column headings "Size" and "Qty" (quantity) in addition to row headings "3.5×5", "4×6", "5×7", "8×10" and "Cstm". The user designation areas are labeled "B" in FIG. 3A. The user can fill in one or more bubbles 56 in the user designation area B adjacent a particular thumbnail image I to "order" the desired number and size of final prints of that digitally stored image.

An "All Pictures" user designation area 64 (FIGS. 3A and 3B) is printed on the upper left corner of the form 22. It has no thumbnail image but has the Size and Qty indicia and associated bubbles to allow the user to order that all portrayed thumbnail images I be printed in particular sizes and quantities.

Considering now in further detail one preferred embodiment of the identity marker 60, and referring again to FIG. 3A, a preferred embodiment of the combination proof sheet and order form 22 further includes at least one identity marker 60. The identity marker 60 represents the image file URL 73 for each qualified image file 3 associated with the indicia 52 on the proof sheet 22. In one preferred embodiment, the identity marker 60 may take the form of a checkerboard grid as shown in FIG. 3D. The identity markers 60 individually or collectively contain a unique pattern associated with the set of digital images 3 used to generate the proof sheet 22. As best understood with reference to FIG. 1A, the combination proof and order sheet 22 can be advantageously used in a system 10 according to the present invention to retrieve the digital images associated with the web page 8 for printing. When a marked proof sheet 22 is placed on the scan platen 122 and optically scanned by the multifunction printer 14, the multifunction printer 14 also detects and interprets the markings made by the user in the image selection user designation areas 54, associates each of the individual image selection user designation areas 54 with a corresponding digital image using the identity marker 60, and carries out the operations specified by the user on the associated digital images.

The checkerboard pattern preferably contains light and dark areas of a non-numeric graphical pattern, easily detectable by the scanner subsystem 86, which are encoded according to conventional means with the image file URLs 73 for the qualified image files 3 represented by the indicia 52. The scanned representation of the graphical pattern is converted by the proof sheet analyzer subsystem 82 into the qualified image file URLs 73.

Instead of a checkerboard pattern, the identity marker 60 may alternatively be implemented as printed text. The printed text preferably contains text strings, each text string containing one or more qualified image file URLs 73. The scanned representation of the text strings are easily detectable by the scanner subsystem 86 and convertable by the proof sheet analyzer subsystem 82 via conventional optical character recognition into the qualified image file URLs 73.

A single identity marker 60 may be used for all URLs or, alternatively, the URLs may be split among multiple identity markers 60. An example of multiple identity markers 60 is to have an identity marker for each image file URL 73 printed adjacent to the indicia 52 and selection area 54 for that image file. Where the identity marker 60 is alphanumeric text, it can provide a human-readable indication to the user of the location of the network 205 of the associated image file.

Encoding the URLs into identity markers 60 that are printed on the proof sheet 22 allows the user may choose to store the proof sheets 22, or copies thereof, in a proof sheet archive 126 for convenient access at a future time when image file retrieval and printing is desired.

Figure 3E:
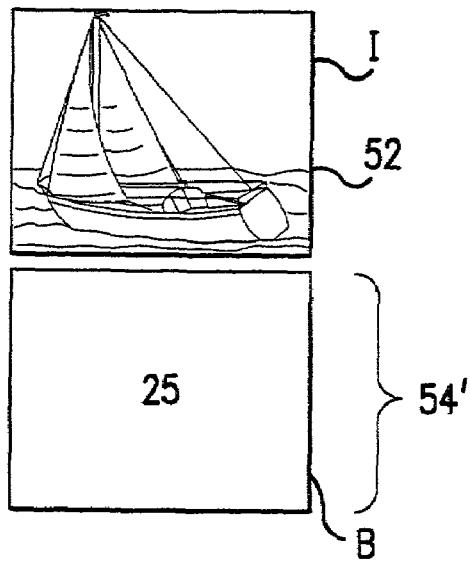
FIG. 3E illustrates image indicia and image specifier areas of the proof sheet of FIG. 3A for selecting image files for final printing.
Figure 3C:
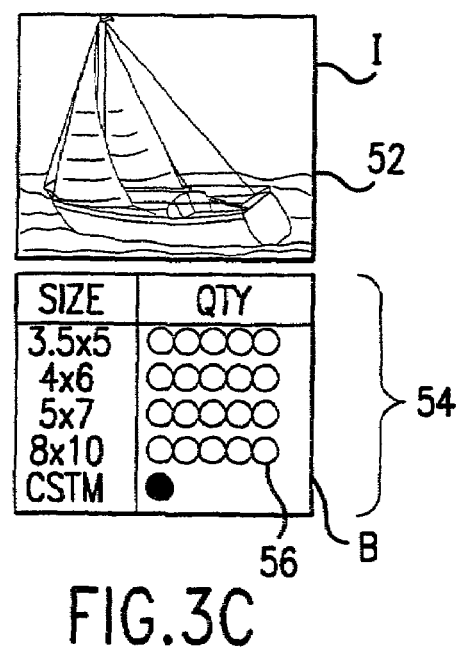
Figure 3D:
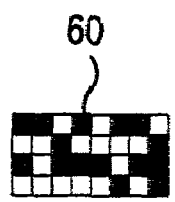
FIG. 3D illustrates an identity marker of the proof sheet of FIG. 3A for identifying the network address of the image files represented on the proof sheet.

In an alternate embodiment of the user-markable proof sheet 22 of FIG. 3A usable with printer that do not include scanning capability, and with reference to FIG. 3E, the proof sheet 22 includes an image specifier 54' along with each image indicia 52. The image specifier 54' is preferably an alphanumeric character string (such as the illustrated numeric character string "25") that can be entered into the printer 14' via pushbuttons 32. Alternatively, the image specifier 54' could be the image file URL 73; however, since the URL 73 is typically quite long, it is generally more convenient to enter via pushbuttons 32 a shorter designator rather than the URL 73. Also, it is generally more convenient to use a numeric rather than an alphanumeric designator for the image specifier 54', since entering alpha characters may be more difficult or not supported on some printers 14'. Another alternative method of entering the image specifier 54' is to implement a menu system with the display 34 and pushbuttons 32; in such an implementation, the display 34 could present the image specifiers 54' for the images on the proof sheet 22 to the user, and the user could scroll through them and select desired ones using the pushbuttons 32.

An embodiment of the proof sheet 22 that uses the image specifier 54' of FIG. 3E will typically omit the identity marker 60, since images are selected for printing by user interaction with the pushbuttons 32 and display 34 of the printer 14' rather than by scanning the proof sheet 22 on multifunction printer 14. Instead, the image proofing subsystem 78 communicates to the image specifier subsystem 82' the correlation between each image specifier 54' and the web page URL 73 of the qualified image file 3 associated with the image specifier 54'. When the image specifier 54' of a selected image file 2 is entered, this correlation is used identify the web page URL 73 and retrieve the selected image file 2.

Before considering in further detail the filtering criteria 76, it is useful to consider the markup language for the web page 8. As is known to those skilled in the art, HTML (hypertext markup language) source code is ASCII-formatted, with the markup commands (or "tags") delimited by a pair of left and right arrows, such as "<tag>". The tags themselves are alphanumeric characters. Some tags are used in pairs, with an opening tag preceding and a closing tag following the text they operate on—for example, <CENTER>Text</CENTER>. Other tags include additional text within the left and right arrows. For example, the <IMG SRC> tag generally used to identify image files 4 for display on the web page 8 include the image file URL 73 within the tag—for example:

<IMG SRC="http://www.website.com/MyPix/Yosemite.jpg" height=400 width=200>

The file type portion of the URL 73 (".jpg") identifies the URL as denoting an image file 4. Types of image files 4 commonly used with web pages 8 include but are not limited to JPEG images (denoted by the file type portion ".jpg") and GIF images (denoted by the file type portion ".gif").

Other text within the tag may give additional information about the image. For example, the "height=400 width=200" portion of the tag specifies the size in pixels of the image 6 as it will appear on the rendered web page 9. This rendering height and width typically indicates the minimum image size of the corresponding image file 4 because, while an image file 4 may be scaled down on the rendered web page 9, in most cases it will not be scaled up because of the degradation in image quality that generally results.

Figure 4:
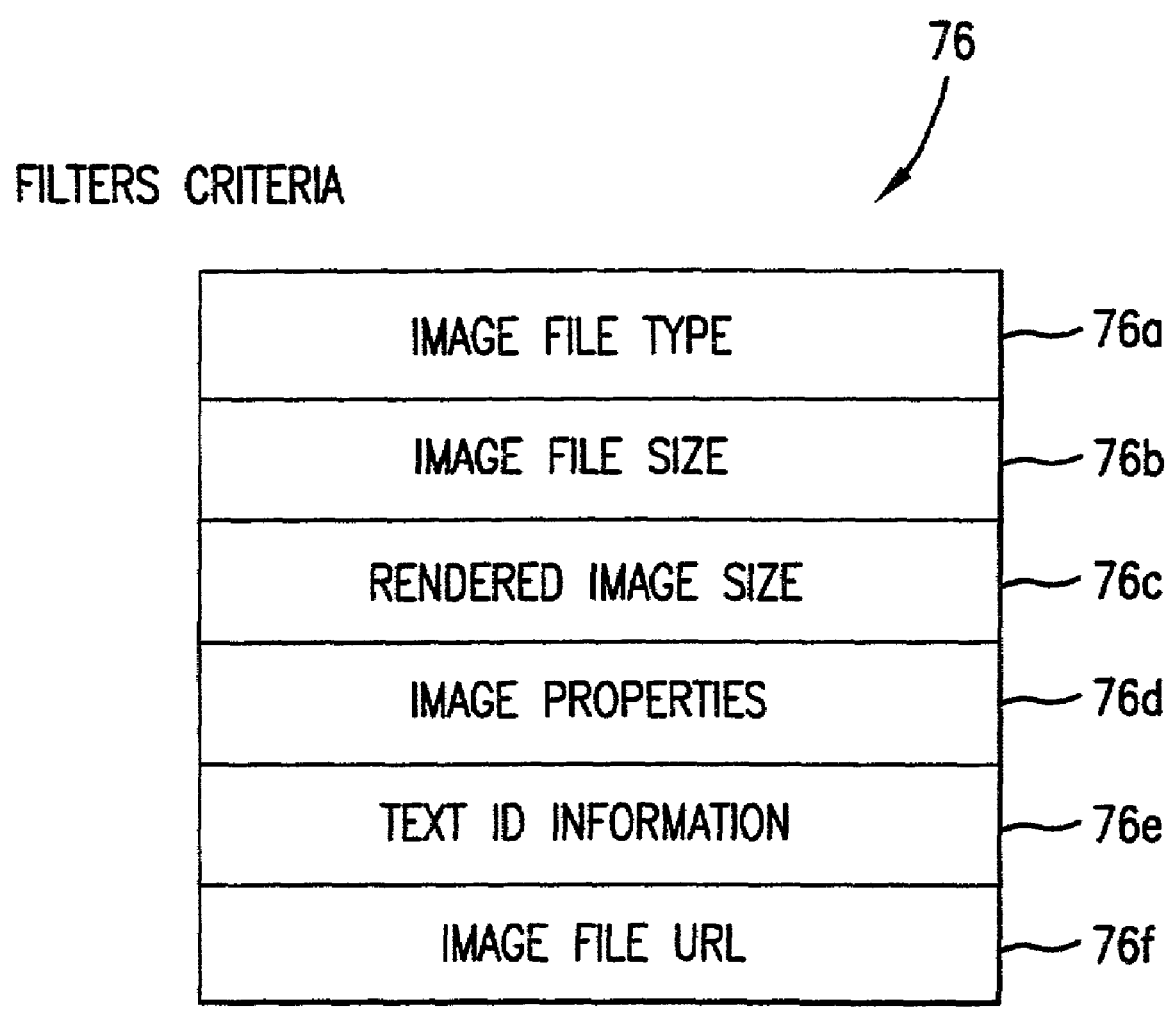
FIG. 4 is a schematic representation of filter criteria usable to qualify certain ones of the image files of FIG. 2B for printing onto the proof sheet.

Considering now in further detail the filtering criteria 76 with reference to FIG. 4, and bearing in mind the preceding discussion of HTML source code, the image files 4 associated with the web page 8 can be filtered against one or more of the filtering criteria 76a–f to determine the qualified image files 3 solely based on the HTML markup text of the web page 8. Each of the filtering criteria 76a–f corresponds to a file attribute of the image files 4. The webpage analyzer subsystem 74 may logically-AND the criteria, logically-OR the criteria, or allow the user to specify the relationship among the criteria 76a–f.

Filtering criteria corresponding to some image file characteristics, such as image file type filter criteria 76a and rendered image size filter criteria 76c for the web page images 4, can be performed based on the web page HTML source. For example, since GIF files often contain small icons and buttons rather than photographic images, the image file type filter criteria 76a might be set to filter out GIF files. Similarly, since small images that must be scaled up to photographic print sizes generally will not produce a print 26 with high image quality, the rendered image size filter criteria 76c might be set to filter out files with less than a specified height, width, or combination thereof.

Additionally, since the image file URL 73 is included in the <IMG SRC> tag, filtering based on one or more image file URL filter criteria 76f can also be performed based on the HTML markup text of web page 8. For example, the user might only be interested in image files from a particular web site (e.g. "www.website.com"), a particular subdirectory (.eg. "MyPix"), or with a particular filename. Preferably the webpage analyzer subsystem 74 implements wild-card processing (e.g. "Yose*"), in order to provide a high level of filtering capability. If the file name incorporates the date the image file 4 was created, as is done for image files 4 created by some digital cameras 12, then the image file URL filtering criteria 76f can filter based on dates. The webpage analyzer subsystem 74 may also implement relational searching (e.g. "before Jan. 1, 2000") in such circumstances.

Other image file characteristics used for filtering, however, cannot be determined solely from the HTML markup text of the web page 8. For example, the user might only be interested in printing image files of a certain file size, or with certain image properties such as a 24-bit color image or a low image compression ratio. These characteristics can be ascertained only after obtaining the image file 4 from the network 205 and examining it further. Therefore, if the user selects filter criteria such as these, the webpage analyzer subsystem 74 provides the URLs for all otherwise-matching files to the internet access subsystem 70, which downloads the image files 4 from the network 205 to the printer 14,14'.

Once the image files 4 are downloaded, the webpage analyzer subsystem 74 can determine the file size, typically in bytes, of each image file 4. The image file size filter criteria 76b can be used in a similar manner to the rendered image size filter criteria 76c, but typically with more confidence as to the probability that the image file 4 will produce a print 26 of high quality, particularly when the image file size filter criteria 76b is used in combination with image property filter criteria 76d such as a true color image and a low image compression ratio.

The textual information filter criteria 76e ascertains and uses textual information associated with the image file 4 for filtering purposes. The textual information is preferably indicative of the nature of the image. The textual information may be contained in a header portion of the image file 4 as is, for example, frequently done with JPG files. The textual information may also be contained in a shadow file having the same web page URL 73 as the image file 4, except for a different predetermined file extension, such as ".txt". The textual information may alternatively be derived from a contextual analysis of the HTML markup text of web page 8. For example, many web pages 8 include a caption or other explanatory information adjacent an image 6, and by analyzing the way the web page 8 will be spacially rendered by a web browser, the textual information related to the image file 4 for the image 6 can be ascertained. Once the textual information is obtained, filtering can be done in a similar manner as has been described heretofore for the image URL filter criteria 76f.

To illustrate the filtering operation performed by the webpage analyzer subsystem 74, and with reference to the exemplary image files for web page 8 as illustrated in FIG. 2B, image files 4a–4c are JPG files, while image files 4d–4e are GIF files. Each image file 4 also has the indicated relative size, with image file 4a the largest and image file 4d the smallest. The exemplary filtering criteria qualifies files that have file type 76a=JPG and image size 76b greater than threshold 90. While image files 4a,b,c,d have a size greater than threshold 90, only files 4a,b,c are JPG files. Therefore the set of qualified image files 3 consists of files 4a,b,c.

Filtering operations performed using only the markup text of web page 8 are generally faster than filtering performed using the image files 4, because typically there are multiple image files 4 for each web page 8, and because at least some of the image files 9 are often bigger than the file of web page 8. However, in some cases filtering performed on the image files 4 instead of or in addition to the web page 8 often provides more accurate results, because, for example the contextual analysis of web page markup text may be inaccurate, or more detailed textual information is contained in the image files 4 than in the markup text of web page 8. The webpage analyzer subsystem 74 may take advantage of this by enabling a filtering setting that chooses either a "fast" filter that filters only based on the markup text of web page 8, or an "accurate" filter that filters based on both the content of image files 4 and web page 8.

Figure 5:
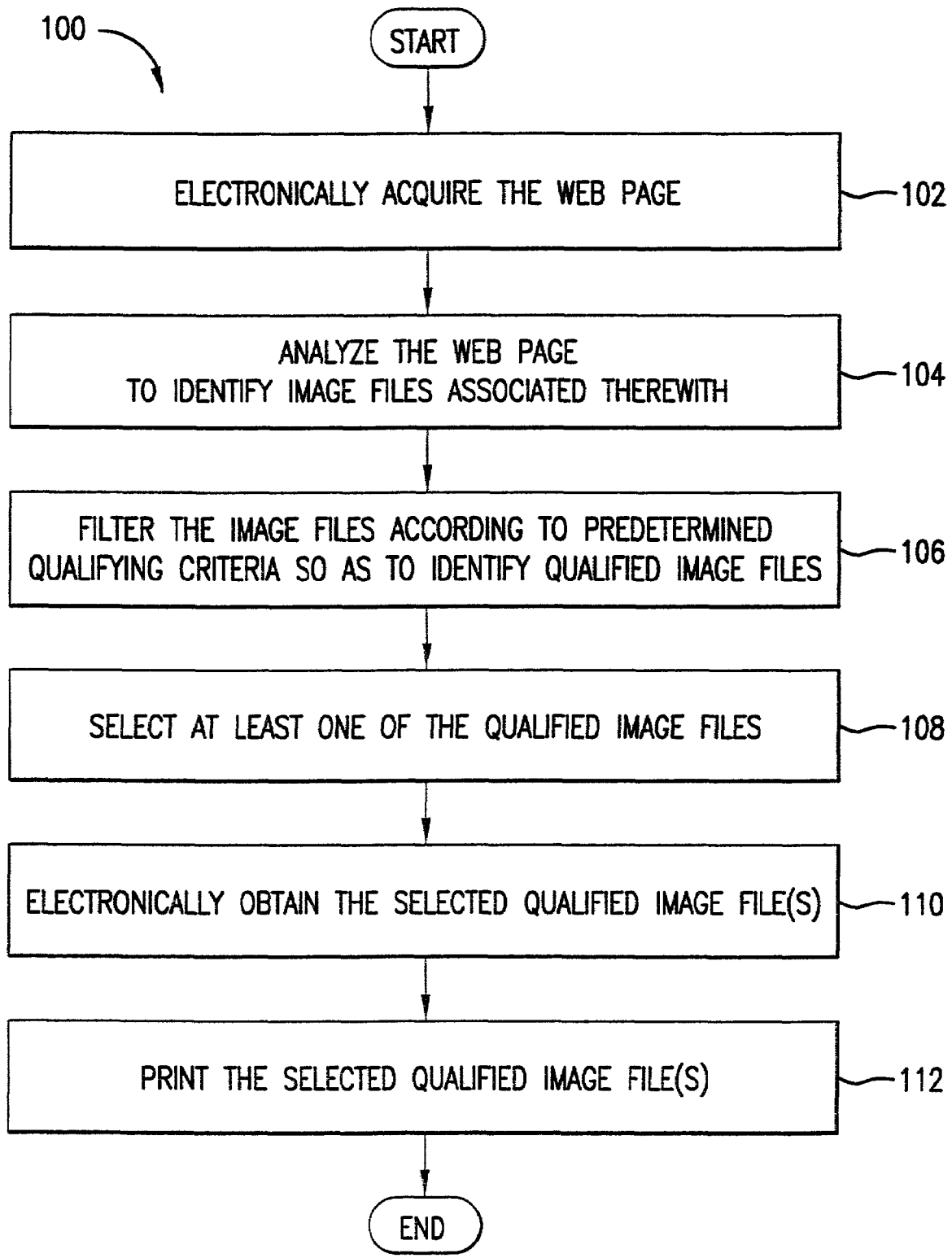
FIG. 5 is a high-level flowchart of a novel printing method according to the present invention that is usable with the multifunction printing system of FIGS. 1A–1B.

Another embodiment of the present invention, as best understood with reference to FIG. 5, is a novel printing method 100 for producing desired image prints 26 on a multifunction printing system 10. The method 100 begins at 102 with electronically acquiring the web page 8. At 104, the web page 8 is analyzed to identify the image files 4 associated with the web page 8. At 106, the image files 4 are filtered according to predetermined qualifying criteria 76 so as to identify qualified image files 3. At 108, at least one of the qualified image files 3 are selected. At 110, the selected qualified image file or files 2 are electronically obtained. At 112, the selected qualified image files 2 are printed, and the method 100 concludes.

Figure 6:
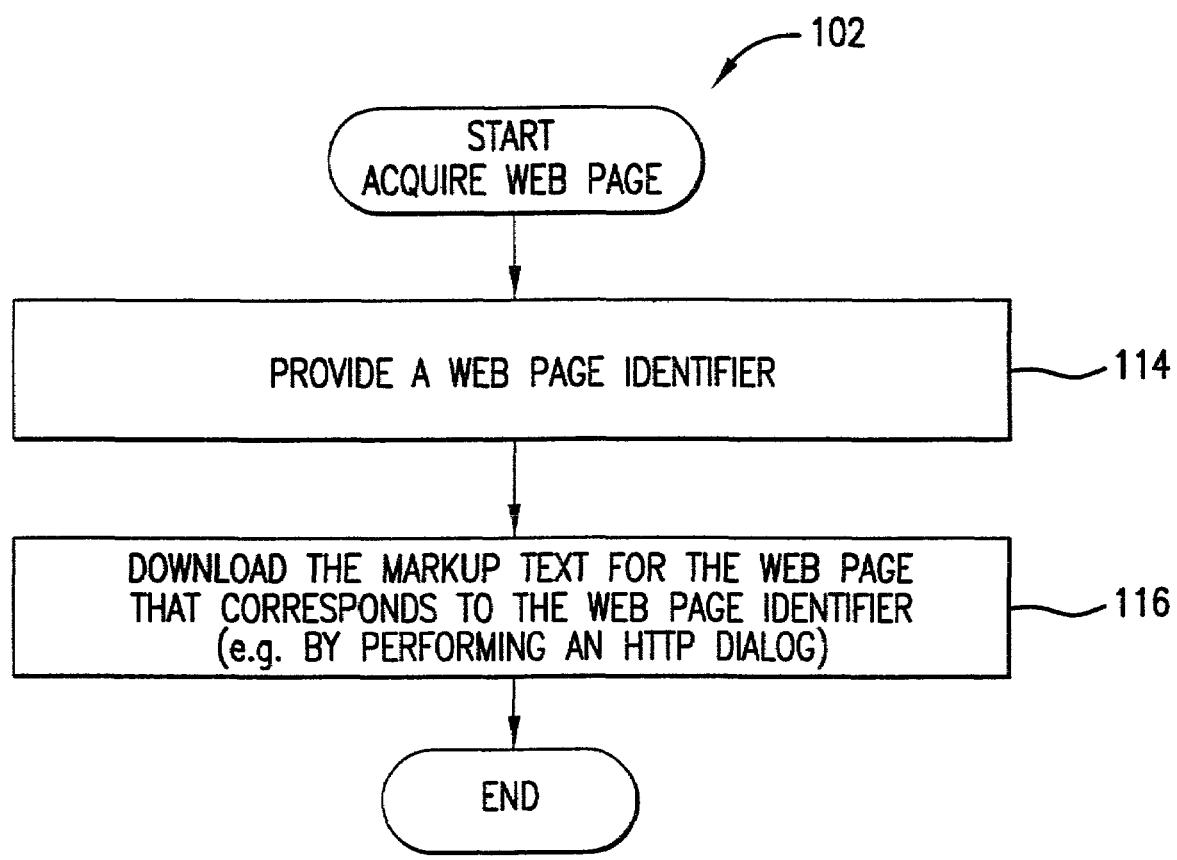
FIG. 6 is a lower-level flowchart of acquiring according to the method of FIG. 5.

Considering now in further detail the acquiring 102 of the web page 8, and with reference to FIG. 6, at 114 a web page identifier is provided. At 116, the markup text for the web page that corresponds to the web page identifier is downloaded and the acquiring 102 concludes. The downloading is preferably accomplished by performing an http (hypertext transfer protocol) dialog to obtain the text, although it could be accomplished by other means such as performing an ftp (file transfer protocol) dialog.

Figure 7:
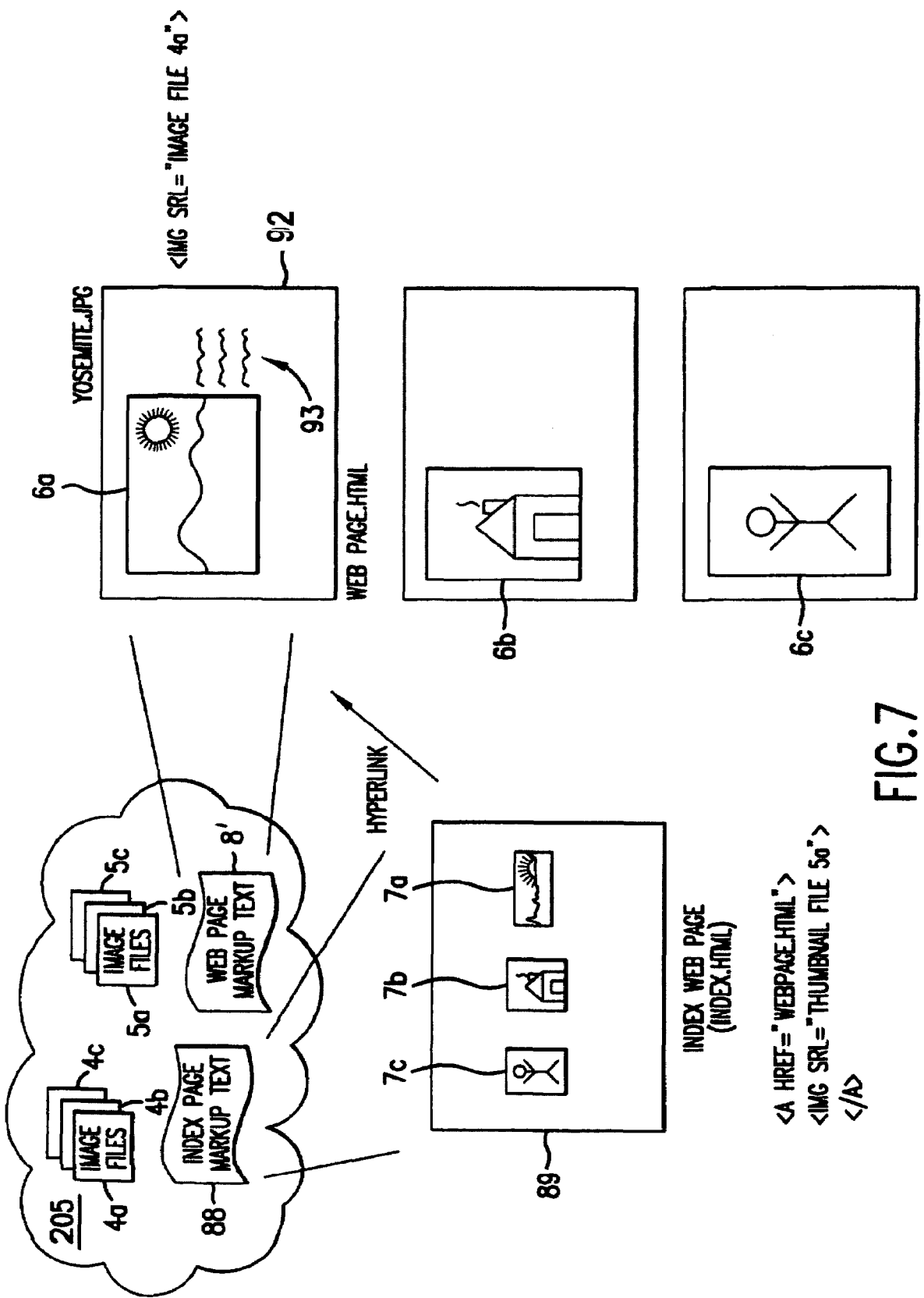
FIG. 7 is a schematic representation of an exemplary set of web pages having linkages between thumbnail images and larger images that is useful in illustrating the operation of the flowchart of FIG. 8.

Before considering in further detail the analyzing 104 of the web page 8, it is useful to consider, with reference to FIG. 7 the implication on the present inventive method of the hyperlinking capability of web pages using hypertext transfer protocol. Hyperlinking allows the user to jump from viewing a first web page 89 to viewing a second web page 92 merely by selecting a particular rendered element of the first web page 89. Among the rendered elements may be a section of text, or an image. Using one image 7a as the hyperlink to another image 6a has advantageous application for photographic image web sites with which the present invention is particularly useful. For example, photo sites frequently include an index web page 88 that, when displayed as rendered web page 89, contains a number of small photographic thumbnail images 7, similar to the indicia 52 produced on the proof sheet 22 of the present invention. When the user selects one of the thumbnails 7 on this rendered index web page 89, another rendered web page 92 appears. This rendered web page 92 typically contains a single larger (or full-size), more detailed, higher quality image 6. When a user wishes to print a proof sheet 22 for the photo web site, it is advantageous to specify the web page URL 72 of the index web page 88, so that he can obtain a proof sheet 22 for a large number of images at a time, rather than just a single image. However, when the user marks this proof sheet 22 to indicate the images 4 for which he desires to produce prints 26, he does not want to have the small thumbnail image files 5 printed, but rather intends that the larger, higher quality image file 4 associated with each small thumbnail image file 5 be used for making the prints 26.

In order to achieve the high-quality prints 26 intended by the user, it is necessary for the method 100 to not only detect (e.g. by searching for "<IMG SRC>" tags) thumbnail image files 5 that will be displayed as thumbnail images 7 on the rendered web page 89 corresponding to the web page URL 72, but also to examine the markup text of web page file 88 adjacent the "<IMG SRC>" tag of each thumbnail image file 5 in order to ascertain other larger, higher quality image files 4 that will not be displayed on the rendered web page 89 but which can be subsequently rendered upon activation of a hyperlink associated with the thumbnail image file 5. The following exemplary markup text fragment from an index web page 88 forms a basis for illustration:

<A HREF="ImageFile_4a.jpg">
    <IMG SRC="ThumbnailFile_5a.jpg" WIDTH=80 HEIGHT=40>
    </A>

In this markup text fragment, the image file "ThumbnailFile_5a.jpg" 5a is a thumbnail image file contained within an "<IMG SRC>" tag. The rendered thumbnail image 7a for the thumbnail file 5a will be displayed on the rendered index web page 89. Surrounding the "<IMG SRC>" tag is a hyperlink, consisting of starting ("<A HREF>") and ending ("</A>") tags. The inclusion of the hyperlink "HREF=ImageFile_4a.jpg" within the starting tag denotes that, when the rendered thumbnail image 7a is selected on the rendered index web page 89, the larger image file "ImageFile_4a.jpg" 4a will be displayed as rendered image 6a, replacing the rendered index web page 89 on the display. Therefore, by parsing the markup text of the web page 88 to determine associations such as hyperlinks for image files, the image files associated with the web page 88 may be determined, regardless of whether any particular image file will or will not be rendered at the same time as the web page 88 is rendered.

It should also be noted that, instead of using a .JPG file as the target of a hyperlink tag, a web page file 8' associated with the larger image file 4a could alternatively be hyperlinked to the thumbnail image 7a by including "HREF=WebPage.html" in the starting tag. This would allow, for example, a caption or other information 93 about the larger image file 4a to be displayed along with the larger rendered image file 6a on the rendered web page 92.

It should further be noted that printing a proof sheet 22 for a web page, such as index web page 88, that contains a large number of images may result in multiple pages of proof sheets 22, if all the image indicia 52 and selection areas 54 cannot fit on a single page. If this situation occurs, each of the multiple pages of proof sheets 22 would preferably include its own identity marker 60, so that each proof sheet page 22 would be individually usable to produce prints 26.

Figure 8:
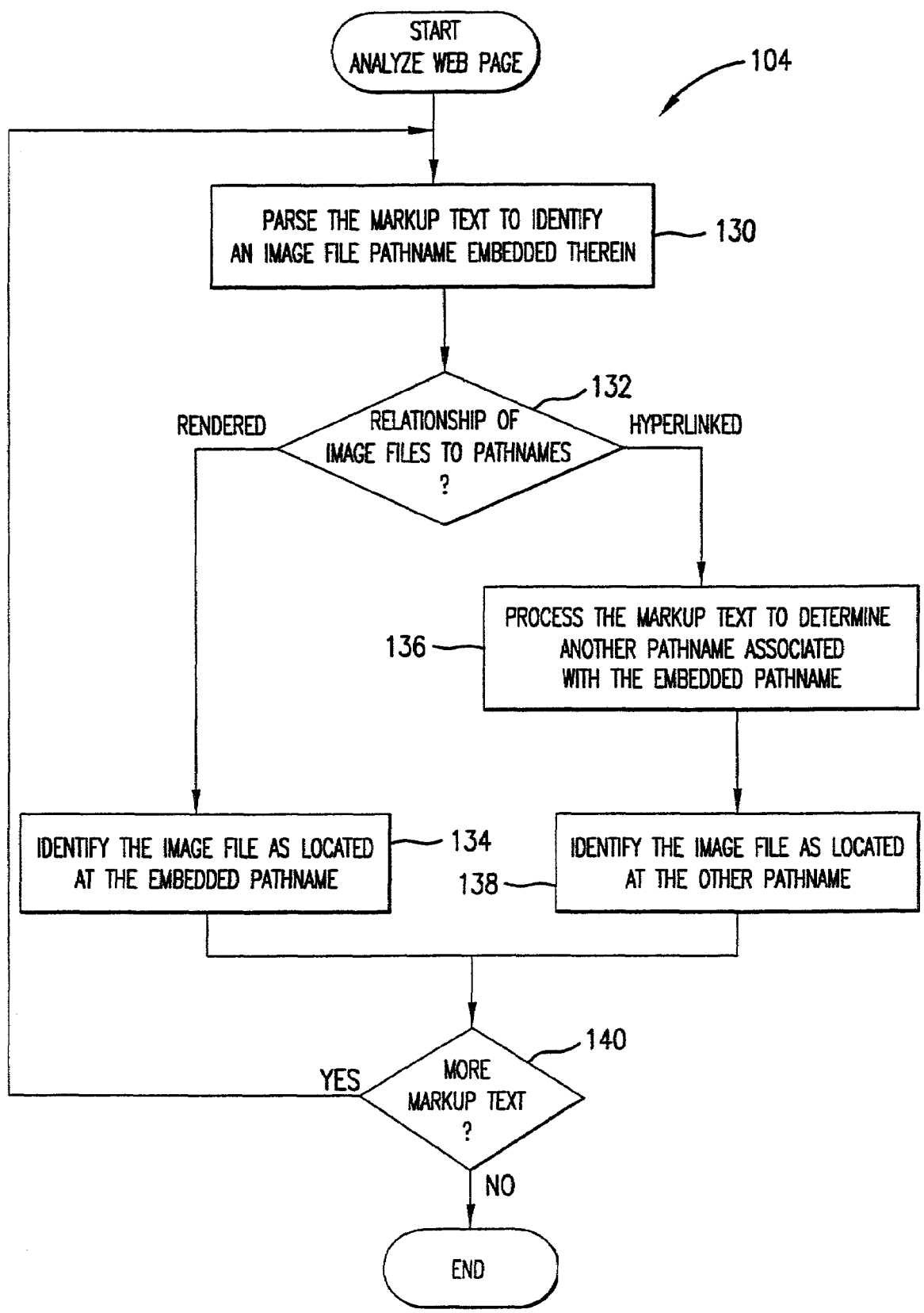
FIG. 8 is a lower-level flowchart of analyzing according to the method of FIG. 5.

Returning now to consider in further detail the analyzing 104 of the web page 8, and with reference to FIGS. 7 and 8, at 130 the markup text of the web page is parsed to identify an image file pathname or URL 73 embedded in the markup text. Preferably this pathname 73 is the image file URL contained within an "<IMG SRC>" tag. At 132, the relationship of the pathname 73 to the corresponding image file 4 is determined.

If the pathname 73 directly specifies the image file (as is the case in web page file 8' for image file 4a), then at 134 (via the "Rendered" branch of 132) the embedded pathname is denoted as the pathname of the image file. Conversely, if the pathname 73 indirectly specifies the image file (as is the case in web page 88 for thumbnail file 5a which then is hyperlinked to image file 4a), then at 136 (via the "Hyperlinked" branch of 132) the markup text is processed to determine the other pathname associated with the embedded pathname, and at 138 the other pathname is denoted as the pathname of the image file.

Regardless of the branch taken at 132, the method continues at 140. If more markup text remains to be processed ("Yes" branch of 140), then the analyzing 104 branches to 130. If all markup text has been processed ("No" branch of 140), the analyzing 104 concludes.

Figure 9:
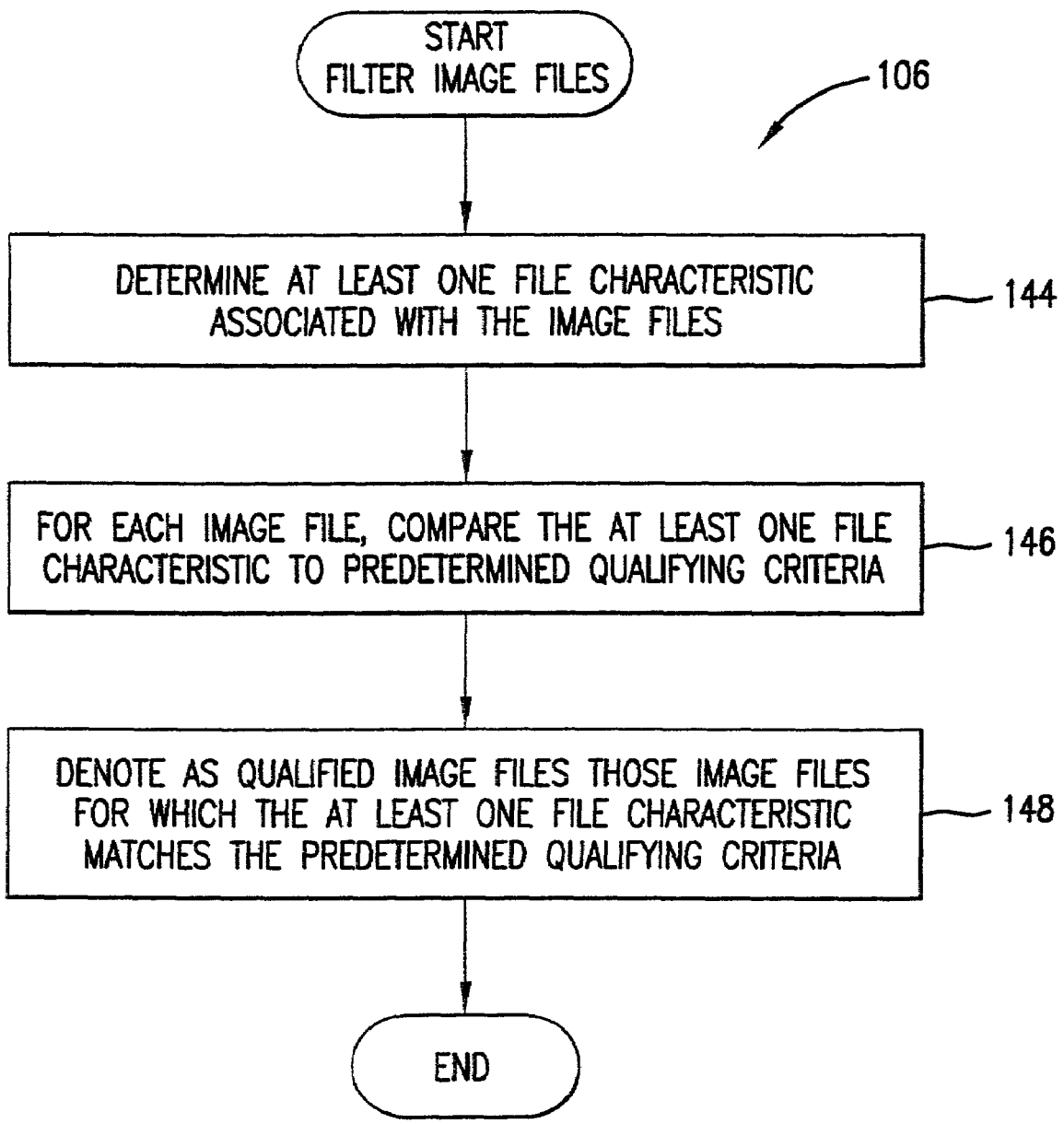
FIG. 9 is a lower-level flowchart of filtering according to the method of FIG. 5.

Considering now in further detail the filtering 106 of the image files 4, and with reference to FIG. 9, at 144 at least one file characteristic associated with the image files 4 is determined. These file characteristics may include file type, file name, file size, image size, image properties, and/or textual information associated with the image file. At 146, for each image file 4 the at least one file characteristic is compared to corresponding predetermined qualifying (or filtering) criteria 76. At 148, those image files for which the at least one file characteristic matches the predetermined criteria 76 are denoted as qualified image files 3.

Figure 10:
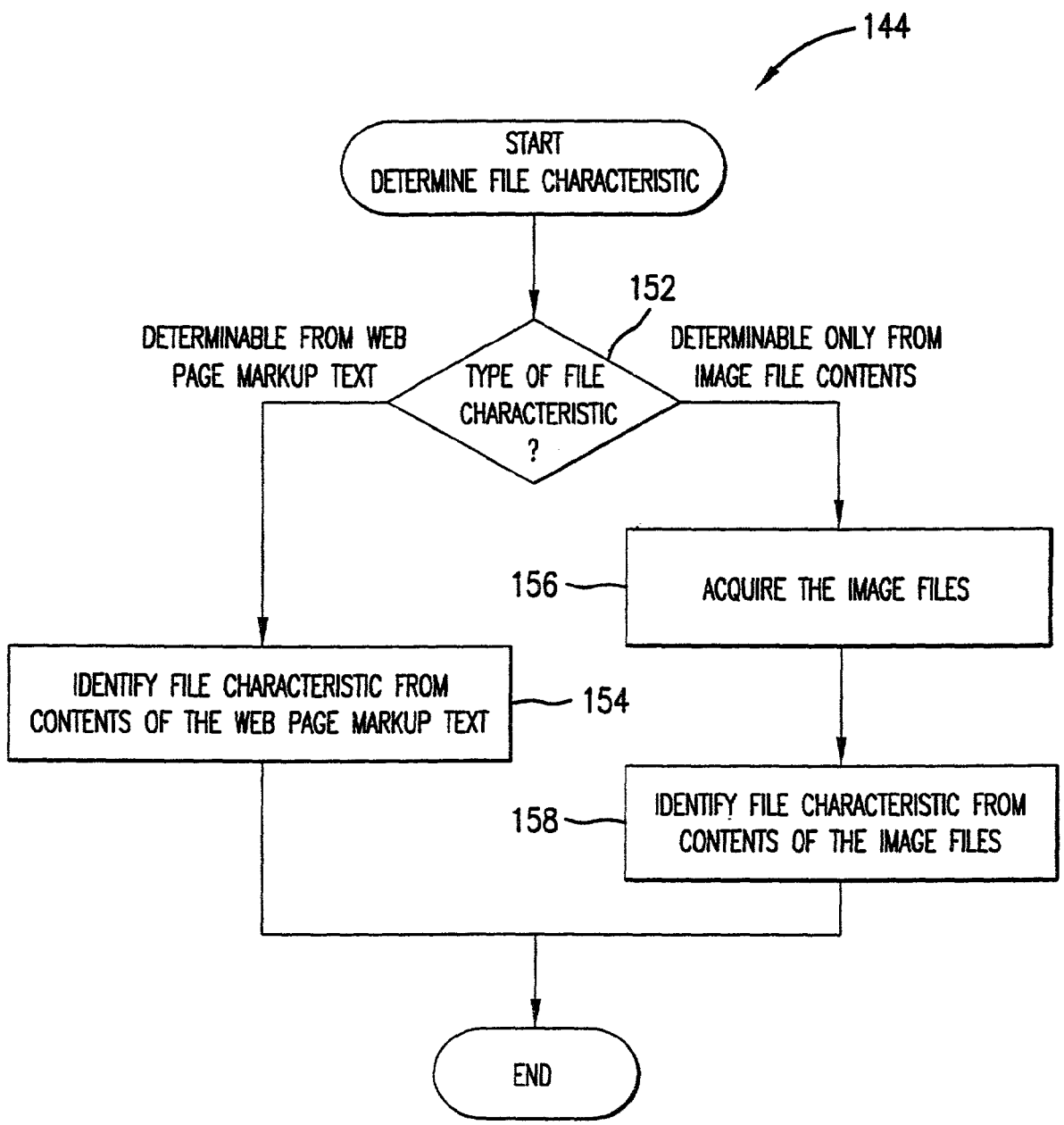
FIG. 10 is a lower-level flowchart of determining file characteristics according to the method of FIG. 5.
Figure 11:
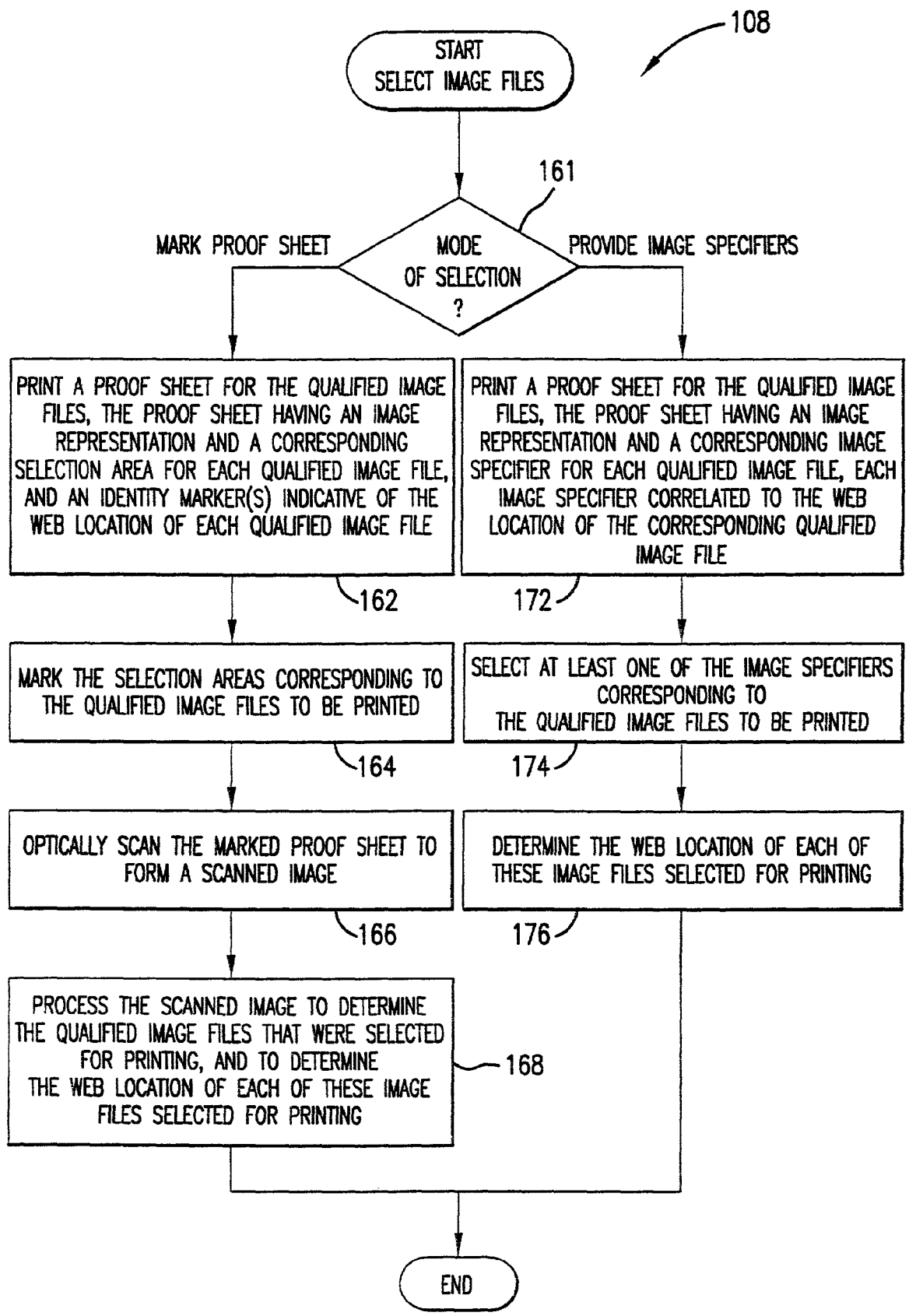
FIG. 11 is a lower-level flowchart of selecting image files according to the method of FIG. 5.

Considering now in further detail the determining 144 of the file characteristic, and with reference to FIG. 10, at 152 the type of the at least one file characteristic associated with the image files 4 is determined. If the file characteristic is determinable from the markup text for the web page 8, then at 154 the file characteristic is identified from the contents of the text source of the web page 8, without requiring that the image files 4 themselves be acquired, and the determining 144 concludes. Conversely, if the file characteristic is determinable only from the contents of the image file 4, then at 156 the image files are acquired, and at 158 the file characteristic is identified from the contents of the image files 4, and the determining 144 concludes. The types of file characteristics determinable from the markup text for the web page 8, and the types of file characteristics determinable only from the image files 4, have heretofore been discussed.

Considering now in further detail the selecting 108 of at least one of the qualified image files 3, and with reference to FIGS. 11, 3A, 3C, and 3E, at 161 the mode by which qualified image files are selected for printing is determined. If a proof sheet 22 containing user selection areas 54 is to be printed, marked by the user, and scanned ("Mark Proof Sheet" branch of 161), then at 162 the proof sheet 22 for the qualified image files 3 is printed. The proof sheet has an image representation 52 and a corresponding selection area 54 for each qualified image file 3, and an identity marker 60 indicative of the web location 73 of each qualified image file 3. At 164, the selection areas 54 corresponding to the qualified image files 3 are marked. Typically this is done using a marker such as a pen or a pencil. At 166, the marked proof sheet 22 is optically scanned to form a scanned image. At 168, the scanned image is processed to determine the qualified image files that were selected for printing, and to determine the web location 73 of each of the selected qualified image files 2 to be printed. After this, the selecting 108 concludes.

Conversely, if a proof sheet 22 containing image specifier areas 54' is to be printed ("Provide Image Specifiers" branch of 161), then at 172 a proof sheet 22 for the qualified image files 3 is printed. The proof sheet 22 contains an image representation 52 and a corresponding image specifier 54' for each qualified image file 3. Each image specifier 54' is correlated to the web location of the corresponding qualified image file 3. At 174, at least one of the image specifiers 54' corresponding to the qualified image files 3 to be printed (eg. the selected qualified image files 2) is selected. At 176 the web location 73 of each of these selected image files 2 is determined. After this, the selecting 108 concludes.

The method 100 is preferably performed by the printer 14,14', and are preferably implemented in firmware or software stored on a program storage medium (not shown) such as a ROM, CD-ROM, or the like and executable by a processor or microcomputer (not shown) disposed within printer 14,14'. Alternatively, method 100 may be implemented in printer hardware such as discrete logic or an ASIC, or in a combination of firmware, software, and hardware.

From the foregoing it will be appreciated that the printing system and method provided by the present invention represent a significant advance in the art. Although several specific embodiments of the invention have been described and illustrated, the invention is not limited to the specific methods, forms, or arrangements of parts so described and illustrated. The invention is limited only by the claims.

What is claimed is:

1. A method of printing with a multifunction printing system, comprising:
    automatically analyzing a web page to identify image files associated with the web page;
    automatically filtering the image files based on an image size characteristic so as to identify ones of the image files larger than a threshold size as qualified image files and to exclude other ones of the image files smaller than the threshold size from the qualified image files;
    printing a proof sheet for at least some of the qualified image files, the proof sheet having an image identifier, at least one identity marker indicative of a web location for each of the at least some of the qualified image files, and at least one corresponding selection area for each of the at least some of the qualified image files;
    marking at least one of the selection areas corresponding to at least one of the qualified image files to be printed;
    optically scanning the marked proof sheet so as to determine marked selection areas;
    determining from the at least one identity marker the web location for those ones of the qualified image files associated with the marked selection areas; and
    printing the qualified image files associated with the marked selection areas.

2. The method of claim 1, further comprising:
    electronically acquiring the web page with the printing system.

3. The method of claim 2, wherein the acquiring further comprises:
    providing a web page identifier; and
    downloading to the printing system a web page source file that corresponds to the web page identifier.

4. The method of claim 3, wherein the downloading further comprises:
    performing a dialog according to http protocol to obtain the web page source file.

5. The method of claim 3, wherein the web page source file contains markup text, and wherein the analyzing further comprises:
    parsing the markup text to identify the image files associated with the web page.

6. The method of claim 5, wherein the parsing further comprises:
    parsing the markup text to identify image file pathnames embedded therein;
    determining which ones of the image files are located at the corresponding image file pathnames; and
    determining which other ones of the image files are located at other pathnames associated with the corresponding image file pathnames.

7. The method of claim 1,
    wherein each selection area includes a plurality of size fields, each size field for specifying a different one of a print size for the corresponding image file,
    wherein the marking includes marking at least one of the size fields,
    wherein the scanning includes determining the marked size fields, and
    wherein the printing the image files further includes printing each selected image file in the print size indicated by the corresponding marked size field.

8. The method of claim 1, wherein the qualified image files are identified at least in part from markup text of the web page.

9. The method of claim 1, wherein the qualified image files are identified at least in part from an examination of the image files.

10. A multifunction printing system, comprising:
    means for automatically analyzing a web page with the printing system to identify image files associated with the web page;
    means for printing a proof sheet for qualified ones of the image files, the proof sheet having an image identifier, at least one identity marker indicative of a web location for the qualified image files, and at least one corresponding selection area for each of the qualified image files, each qualified one of the image files identified by matching a filter criterion with textual information associated with the qualified one of the image files but separate from a URL of the qualified one of the image files;
    means for scanning the marked proof sheet after user-marking of at least one of the selection areas corresponding to at least one of the qualified image files to be printed so as to determine marked selection areas; and
    means for determining from the at least one identity marker the web location for those ones of the qualified image files associated with the marked selection areas; and
    means for printing the qualified image files associated with the marked selection areas.

11. A method of printing with a printing system, comprising:
    analyzing a web page with the printing system to identify image files associated with the web page;
    filtering the image files with the printing system according to predetermined criteria indicative of at least one file characteristic so as to identify certain ones of the image files as qualified image files, the predefined criteria including a filter criterion for comparison with textual information associated with a particular image file but separate from a URL of the particular image file;
    selecting at least one of the qualified image files; and
    printing the selected ones of the qualified image files, wherein the textual information associated with the particular image file is located in a shadow file different from but associated with the particular image file.

12. The method of claim 11, wherein the filter criterion is indicative of the nature of the image.

13. The method of claim 11, wherein the selecting further comprises:
    printing a proof sheet for the qualified image files, the proof sheet having for each of the qualified image files an image indicia and a corresponding selection area;
    marking at least one of the selection areas corresponding to at least one of the qualified image files to be printed;
    optically scanning the marked proof sheet to form a scanned image; and
    processing the scanned image so as to determine the selected ones of the qualified image files.

* * * * *